(12) United States Patent
Vahdat-Pajouh et al.

(10) Patent No.: US 12,307,709 B2
(45) Date of Patent: May 20, 2025

(54) DEVICE AND METHOD FOR POSITION DETERMINATION IN A 3D MODEL OF AN ENVIRONMENT

(71) Applicant: Design Reactor, Inc., Palo Alto, CA (US)

(72) Inventors: Darius Vahdat-Pajouh, Berlin (DE); Michal Bucko, Berlin (DE)

(73) Assignee: Design Reactor, Inc., Palo Alto, CA (US)

( * ) Notice: Subject to any disclaimer, the term of this patent is extended or adjusted under 35 U.S.C. 154(b) by 629 days.

(21) Appl. No.: 17/238,739

(22) Filed: Apr. 23, 2021

(65) Prior Publication Data

US 2021/0295557 A1    Sep. 23, 2021

Related U.S. Application Data

(63) Continuation of application No. PCT/EP2019/079338, filed on Oct. 28, 2019.

(30) Foreign Application Priority Data

Oct. 26, 2018  (DE) .................. 10 2018 126 855

(51) Int. Cl.
*G06T 7/73* (2017.01)
*G06T 19/00* (2011.01)

(52) U.S. Cl.
CPC .............. *G06T 7/74* (2017.01); *G06T 7/75* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 9,261,365 B2 | 2/2016 | Rothschild | |
| 2014/0368539 A1* | 12/2014 | Yeh | G02B 27/017 345/633 |
| 2017/0343356 A1 | 11/2017 | Roumeliotis et al. | |
| 2019/0094027 A1* | 3/2019 | Xu | G06T 7/248 |
| 2019/0362157 A1* | 11/2019 | Cambias | G06V 10/255 |
| 2020/0109954 A1* | 4/2020 | Li | G01C 21/3852 |

OTHER PUBLICATIONS

Liu et al ("Robust Keyframe-based Monocular SLAM for Augmented Reality", 2016 IEEE International Symposium on Mixed And Augmented Reality (ISMAR), IEEE, Sep. 19 2016, pp. 1-10, XP033023401, DOI: 10.1109/ISMAR.2016.24) (Year: 2016).*
Chinese Office Action for application No. 2019800752911 dated May 23, 2024, pp. 1-8 (non-english).
European Office Action for application No. 19772993.2 dated Aug. 4, 2023, pp. 1-4 (non-english).

\* cited by examiner

*Primary Examiner* — Leon Viet Q Nguyen
(74) *Attorney, Agent, or Firm* — Pillsbury Winthrop Shaw Pittman LLP

(57) ABSTRACT

An apparatus and method for position determination in a 3D model of an environment and a computer-executed iterative method for position determination in a 3D model of an environment. The method includes the steps of: a) acquisition of camera, gyroscope and accelerometer data, b) determination of visual features from the acquired camera sensor data, c) creation of a current key image of the pose (PK) from the visual features and the gyroscope and accelerometer sensor data, d) addition of the key image of the pose (PK) to a database, and e) position determination by comparing the current key image of the posture (PK) with those of the database.

12 Claims, 4 Drawing Sheets

DEVICE AND METHOD FOR POSITION DETERMINATION IN A 3D MODEL OF AN ENVIRONMENT

CROSS-REFERENCE TO RELATED PATENT APPLICATIONS

This patent application is a continuation of International Application No. PCT/EP2019/079338, filed on Oct. 28, 2019, which claims the benefit of priority to German Patent Application No. 10 2018 126 855, filed Oct. 26, 2018, the entire teachings and disclosures of both applications are incorporated herein by reference thereto.

DESCRIPTION

The present invention relates to a device and a method for position determination in a 3D model of an environment.

PRIOR ART 3D models of objects and of environment have a steadily increasingly important role in the field of augmented reality. In order to place content realistically in the augmented reality, increasingly efficient devices and methods for capturing, transforming, and positioning objects and environments in 3D models are needed.

In the past, images of an object were captured and then a 3D model was created from the images in an elaborate process. Today, however, a 3D model is created almost in real time while continuously capturing the environment. A wide variety of image processing techniques and devices are used for this purpose.

However, for capturing, converting and positioning, high demands are placed on the required devices. This is impractical for some applications, in particular, expensive 3D camera systems are required to enable position-specific images.

DISCLOSURE OF THE INVENTION

It is therefore an object of the present invention to provide an inexpensive and efficient device and method for creating 3D models of the environment, make the created 3D model available to the augmented reality, and enable position determination in the created 3D model.

A device for capturing 3D models according to the invention comprises a mobile device, comprising a camera, an accelerometer, and a gyroscope, configured to create a three-dimensional (3D) model of the environment, wherein for the creation of the model, a map of salient points and an RGB map are generated from a data stream of the camera, accelerometer, and gyroscope.

One idea of the present invention is to use existing mobile devices, such as for example cell phones or tablets, to enable a fast and efficient recording of the environment, for the purpose of a 3D model creation, using a special method. This has the advantage that by using already existing mobile devices no additional hardware is required for the recording of 3D models as well as the created 3D models are made available to the augmented reality and a position determination in the recorded 3D model is made possible.

Preferably, salient points are understood as particular visual features in image files, among others points with strong contrast differences that can be detected across multiple images.

In one embodiment of the invention, a computer-executed iterative method for determining position in a 3D model of an environment is disclosed, comprising the steps of:
(a) acquisition of camera, gyroscope and accelerometer data,
b) determination of visual features from the acquired camera sensor data,
c) creation of a current key image of the pose from the visual features and the gyroscope and accelerometer data,
(d) addition of the key image of the pose to a database,
e) position determination by comparing the current key image of the pose with those of the database.

In another embodiment of the invention, a device for position determination in a 3D model of an environment is disclosed, comprising a mobile device comprising:
a) a camera,
b) a gyroscope, and
c) an acceleration sensor, wherein
d) the mobile device is configured to execute a computer-executed iterative method for position determination in a 3D model of an environment, comprising the steps of:
e) acquisition of camera, gyroscope, and accelerometer data,
f) determination of visual features from the acquired camera sensor data,
g) creation of a current key image of the pose from the visual features and the gyroscope and accelerometer data,
h) addition of the key image of the pose to a database,
i) position determination by comparing the current key image of the pose with those of the database.

In another embodiment of the invention, a computer program product for position determination in a 3D model of an environment is disclosed, comprising instructions which, when the program is executed by a computer, cause the computer to execute a computer-executed iterative method for position determination in a 3D model of an environment, comprising the steps of:
a) acquisition of camera, gyroscope, and accelerometer data,
b) determination of visual features from the acquired camera sensor data,
c) creation of a current key image of the pose from the visual features and the gyroscope and accelerometer data,
d) addition of the key image of the pose to a database,
e) position determination by comparing the current key image of the pose with those of the database.

Preferably, the definition of the map of salient points is a database in which the information of the calculated salient points and the relative position data of the gyroscope and the accelerometer have been unified.

A preferred definition of environment and space is anything that can be captured by a camera, including objects, living things, and also the quality of the outside world.

Preferably, the definition of RGB map is a database where the visual image data of the camera has been unified with the relative position data from the gyroscope and the accelerometer.

Preferably, the 3D model is visually displayed on a display device, formed in order to allow a user to add contents of the augmented reality and subsequently unify the information of the visual display with the map of salient points.

Preferably, the position of the mobile device in the 3D model is determined, wherein the salient points are compared with the previously generated map of salient points by the mobile device.

Preferably, the contents of the augmented reality are visually adapted to the position of the mobile device.

Preferably, if in the time between an analysis of an image and a placement of the contents of the augmented reality the mobile device is moving, a direction correction and an angle correction are considered for the visual representation of the contents of the augmented reality.

Preferably, the data stream from camera, accelerometer, and gyroscope is transmitted to a server for data analysis.

Preferably, at least 10 data packets per second are transmitted to the server, more preferably at least 20, and even more preferably at least 30.

Preferably, a data packet contains the information of the salient points and their associated RGB values.

Preferably, a map of the salient points is created from the salient points and by machine learning.

Preferably, an RGB map is created from image files of the camera.

Preferably, before the data packets are transmitted to the server, the salient points are determined from the data from camera, accelerometer, and gyroscope.

Preferably, a 3D reconstruction is performed on the server based on the transmitted data.

In a preferred embodiment, to create the 3D model, salient points are determined, visual-inertial odometry is performed, loop closure is performed, and then bundle block adjustment is performed.

In a preferred embodiment, the salient points are determined using Oriented FAST and Rotated BRIEF (ORB) techniques and 3D reconstruction is performed using the ORB-SLAM (Simultaneous Positioning and Mapping) library.

Preferably, the camera has a resolution greater than 1 megapixel, more preferably greater than 5 megapixels, most preferably greater than 20 megapixels.

Preferably, the camera transmits at least 5 images per second, more preferably at least 20 images, and even more preferably at least 30 images.

Preferably, the position of the mobile device is determined to an accuracy of at most 50 cm, more preferably at most 20 cm, and even more preferably at most 5 cm.

BRIEF DESCRIPTION OF THE DRAWINGS

Exemplary embodiments of the invention are now described herein with reference to the figures. There is shown, FIG. 1 a first exemplary embodiment of the invention, FIG. 2 a second exemplary embodiment of the invention, FIG. 3 an exemplary overview of a third embodiment of the method according to the invention, FIG. 4 an illustration of the posture determination of a mobile device.

DETAILED DESCRIPTION OF THE DRAWINGS

Figure 1:
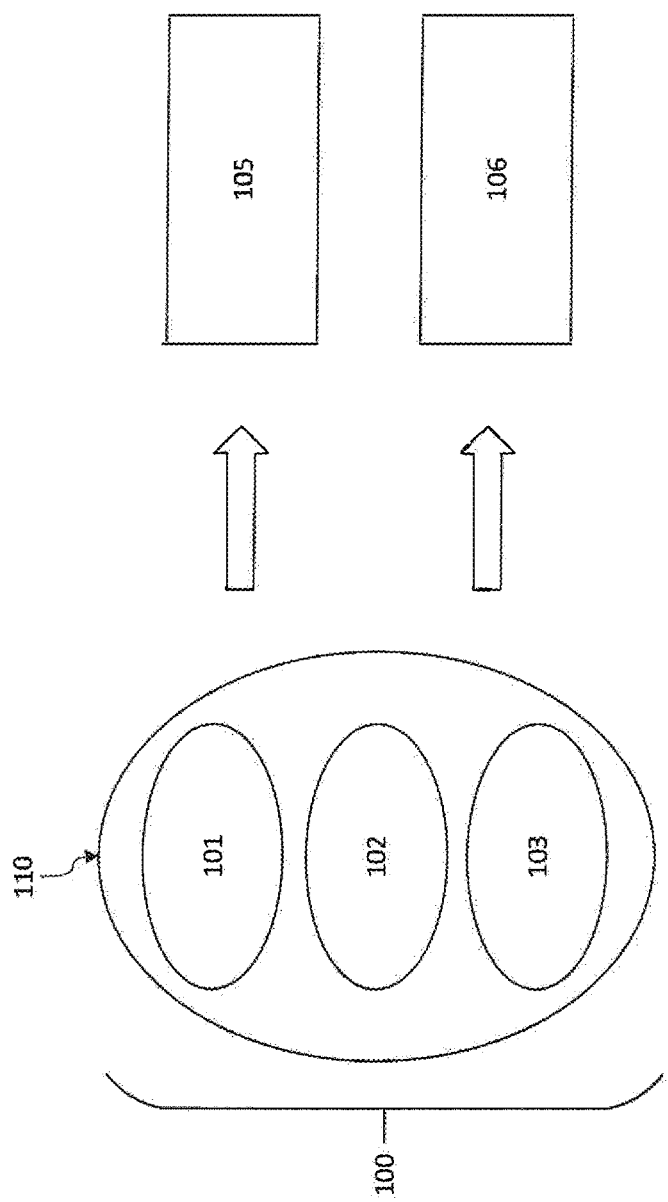

In the device 100 shown in FIG. 1, a map of salient points 105 and an RGB map 106 are generated on the mobile device 110 from the data stream from the mobile device 110, comprising a camera 101, a gyroscope 102, and an accelerometer 103.

Figure 2:
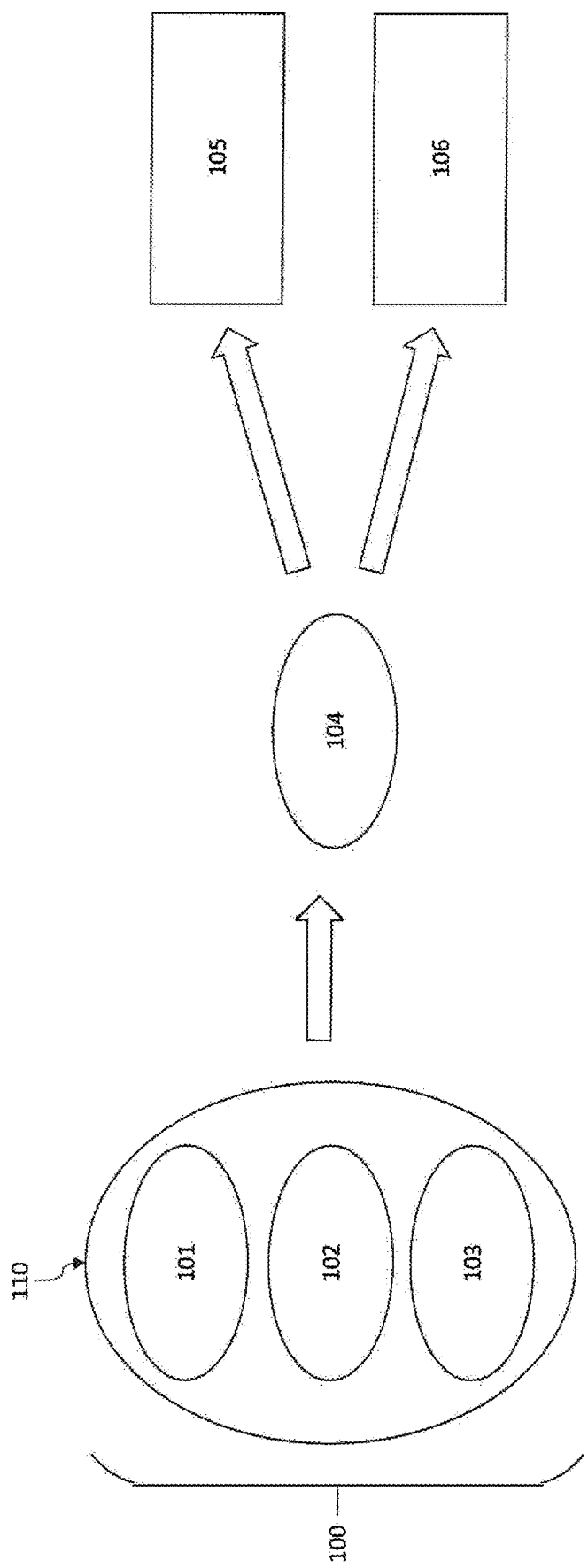

In FIG. 2, in contrast to the previously shown embodiment, the data stream of the sensors 101, 102, 103 is transferred to a server 104, on which a map of salient points 105 and an RGB map 106 are generated from the data.

Figure 3:
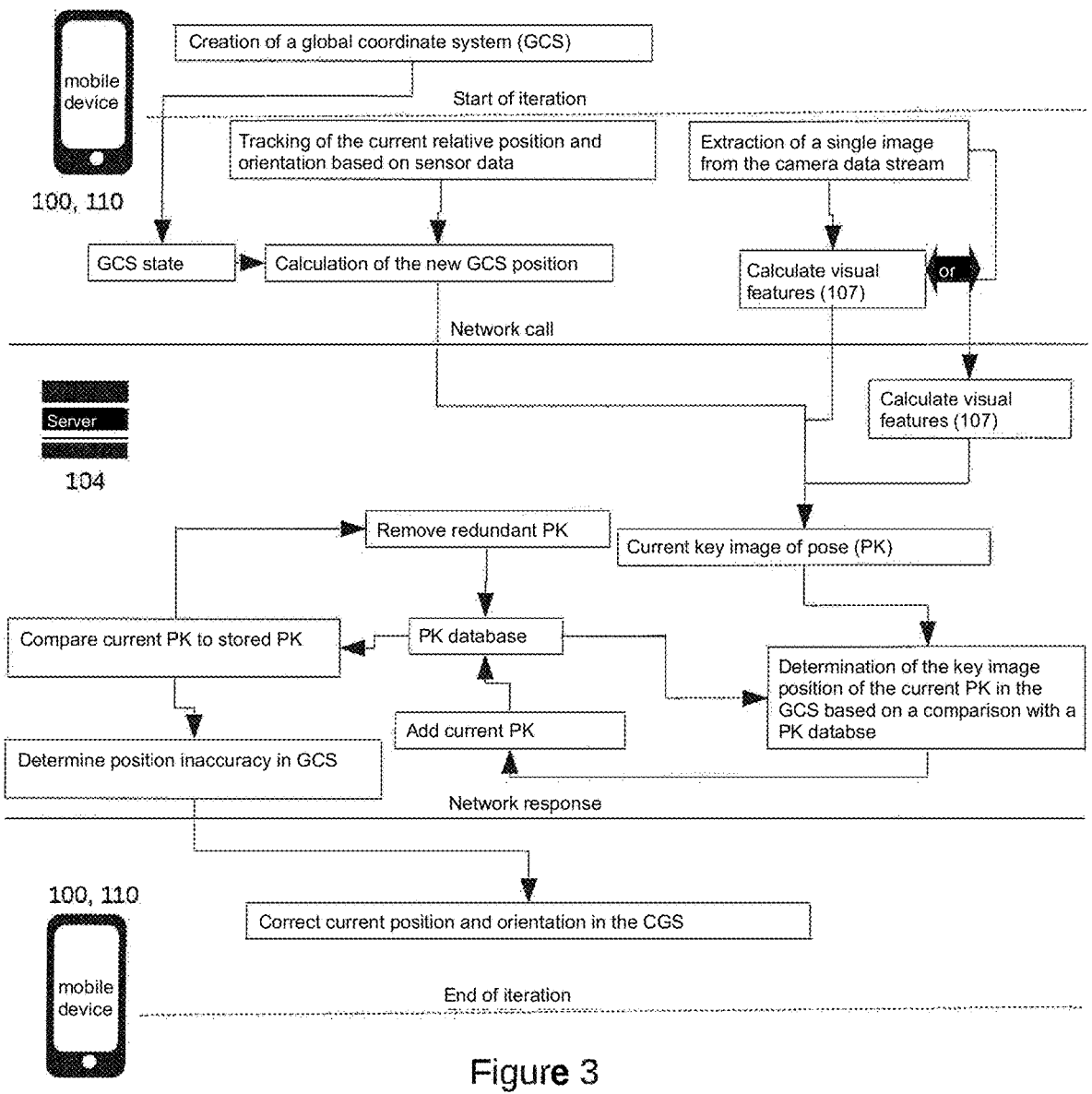

FIG. 3 shows an exemplary overview of a third embodiment of the method according to the invention.

On a mobile device 110, a data stream from the mobile device's sensors (accelerometer 103, gyroscope 102) is used to determine the relative orientation of the mobile device 110 in space. After that, to calculate the position of the mobile device 110 in a previously created global coordinate system (GCS), the GCS state is transmitted to the mobile device 110 and the current relative position is matched with the GCS state. In addition, a single image (frame) is extracted from the data stream of the camera 103 and visual features 107 of the single image are calculated either on the mobile device 110 itself, or after a connection to a server 104 has been established thereon. The visual features 107 of the single image and the position of the mobile device 110 in the global coordinate system GCS are used by the server 104 to determine a current key image frame of the pose (pose keyframe, PK). This pose keyframe PK is compared to a pose keyframe database (PK database) on the server 104, and the keyframe position of the current pose keyframe PK in the global coordinate system GCS is determined therefrom. To this end, the current PK is added to the PK database and then the current PK is compared to the previously stored PKs of the database. In this process, redundant PKs are removed from the database and a current position inaccuracy of the current PK with respect to the GCS is determined based on the comparison. Finally, the position inaccuracy is transmitted from the server 104 to the mobile device 110, which uses it to correct its current position and orientation in the GCS.

This process is an iterative process that is continuously executed to always determine the current position and orientation of the mobile device 110 in the global coordinate system GCS.

Figure 4:
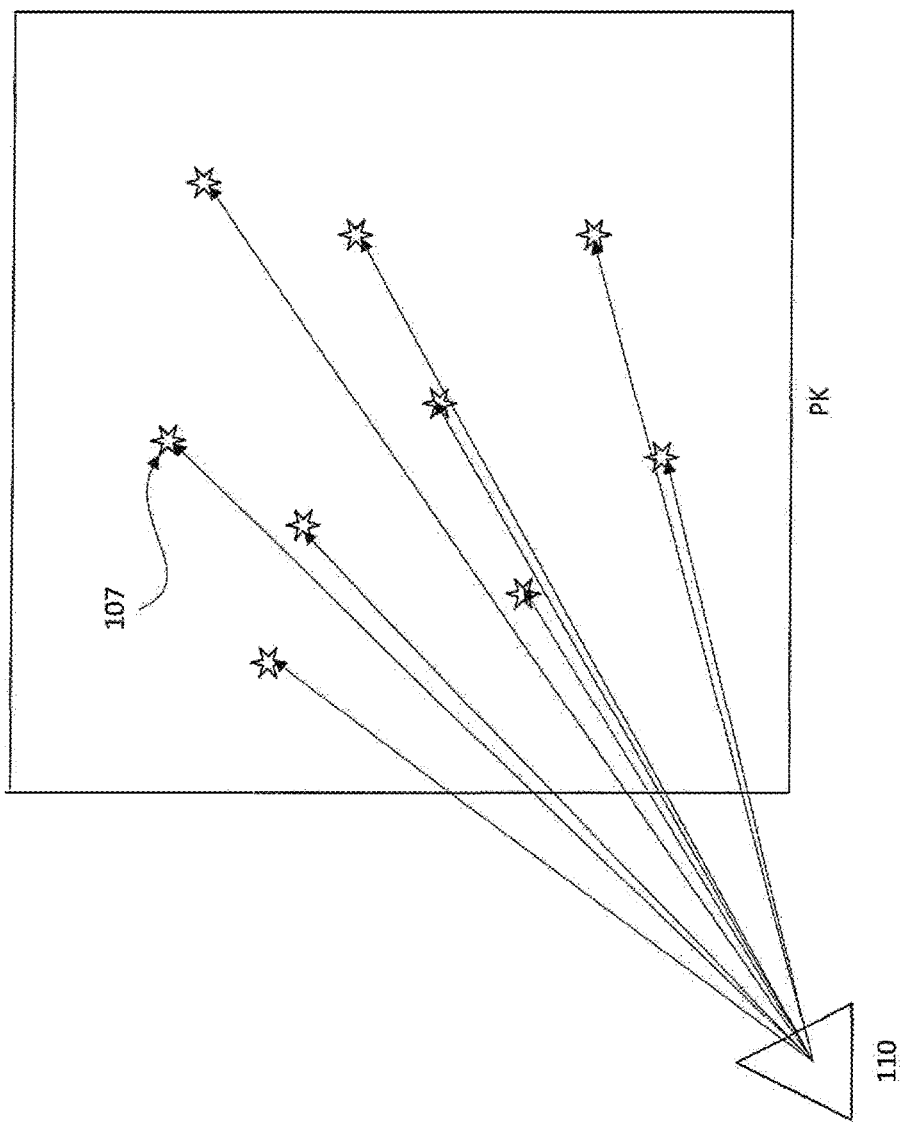

FIG. 4 is a visual representation of a part of the method of the method according to the invention. Salient points 107 are determined from a pose keyframe (PK). Based on the salient points 107 and the data from the sensors of the mobile device 110, the orientation of the mobile device 110 with respect to the salient points (107) is predicted.

LIST OF REFERENCE SIGNS

100 device according to the invention
110 mobile device
101 camera
102 gyroscope
103 acceleration
104 server
105 map of salient points
106 RGB map
107 salient points (visual features)
GCS global coordinate system (global coordinate system)
PK key image of the pose (pose keyframe)

The invention claimed is:

1. Iterative method executed by a computer for position determination in a 3D model of an environment, comprising the steps of:
   aquiring, by a mobile device, of camera, gyroscope and accelerometer data,
   determining visual features from the acquired camera sensor data,
   creating a current key image of the pose (PK) from the visual features and the gyroscope and accelerometer data, adding of the key image of the pose (PK) to a pose database (PK database), and determining position by comparing the current key image of the pose (PK) with those of the PK database, wherein the key image of the pose (PK) is compared with the pose database (PK database) on a server and from this comparison, the key image position of the current key image of the pose (PK) is determined in a coordinate system, wherein the current key image of the pose (PK) is compared with key images of the pose previously stored in the database, unnecessary key images of the pose (PK) are removed from the pose database, based on the comparison, a current position inaccuracy of the current key image of the pose (PK) relative to the coordinate system is determined, the position inaccuracy is transmitted from the server to the mobile device and the mobile device thus corrects its current position and orientation in the coordinate system, and wherein the 3D model comprises a salient point map and an RGB map, wherein the salient point map includes a database unifying:

a plurality of salient points that include visual features of an image file of the environment, among other points, that have contrast differences that are detectable across multiple image files of the environment, and relative position of the gyroscope data and the accelerometer data.

2. Device for position determination in a 3D model of an environment, comprising a mobile device comprising:
a camera,
a gyroscope and
an accelerometer, wherein
the mobile device is configured to perform the steps of the method of claim 1.

3. The method of claim 1, wherein an RGB map is iteratively created from the camera, gyroscope, and accelerometer data and includes a database of visual image data from the camera being unified with the relative position of the gyroscope and accelerometer.

4. Method according to claim 1, wherein the visual features are determined using an Oriented FAST and Rotated BRIEF (ORB) algorithm.

5. Method according to claim 1, wherein the camera, gyroscope and accelerometer data are transmitted to a server.

6. Method according to claim 5, wherein a 3D reconstruction is performed on the server using the transmitted data to create the 3D model of the environment.

7. Method according to claim 6, wherein the 3D reconstruction is performed using a ORB-SLAM library.

8. Apparatus for position determination in a 3D model of an environment, comprising a mobile device comprising:
a camera,
a gyroscope,
an accelerometer, and
a display device, wherein
the mobile device is configured to perform the steps of the method according to claim 1, wherein
the display device is configured to,
visually displaying the 3D model of the environment.

9. Apparatus according to claim 8, wherein the mobile device is configured to enable adding and displaying contents of the augmented reality on the display device.

10. Apparatus according to claim 9, wherein the position information of the contents of the augmented reality displayed on the display device is unified with the database.

11. Apparatus according to claim 10, wherein the contents of the augmented reality are continuously visually adjusted to the determined position of the mobile device.

12. Apparatus according to claim 11, wherein upon movement of the mobile device during the time between an analysis of an image and a placement of the contents of the augmented reality, a directional and angular correction for the visual representation of the contents of the augmented reality is taken into account.

* * * * *